Figure 1:
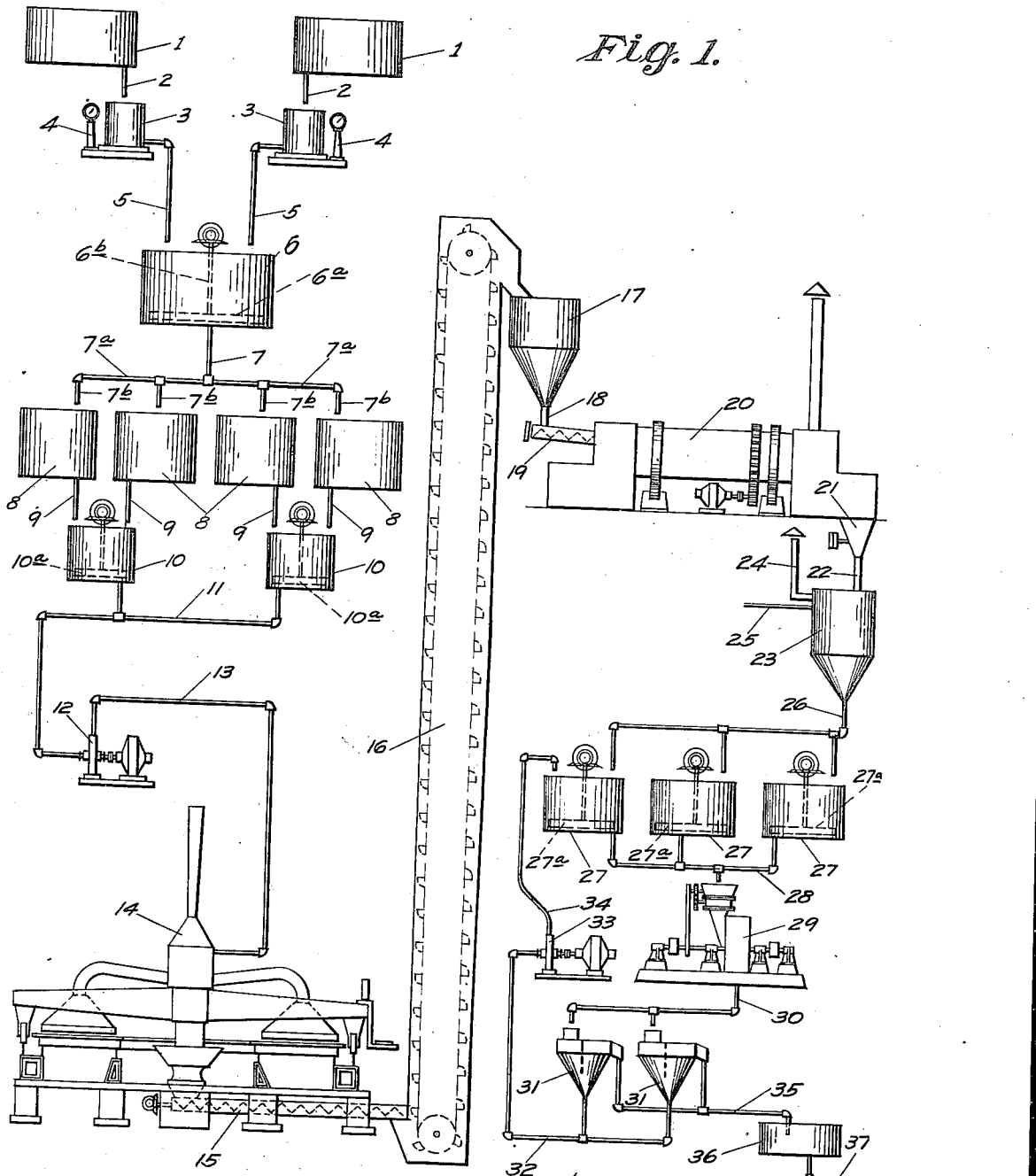

Mar. 6, 1923.
W. R. MACKLIND
1,447,592
APPARATUS AND PROCESS FOR MAKING LITHOPONE
Filed Aug. 16, 1919
2 sheets-sheet 2
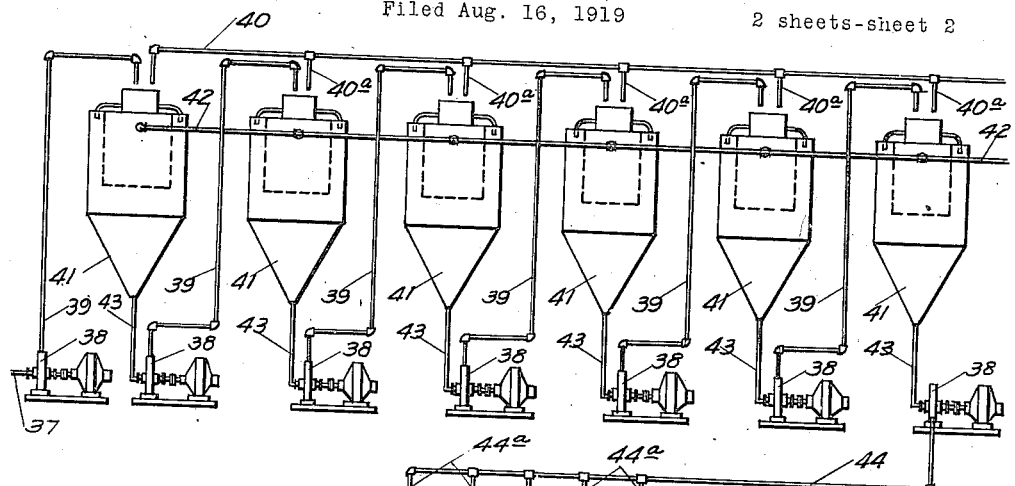
Fig. 2.
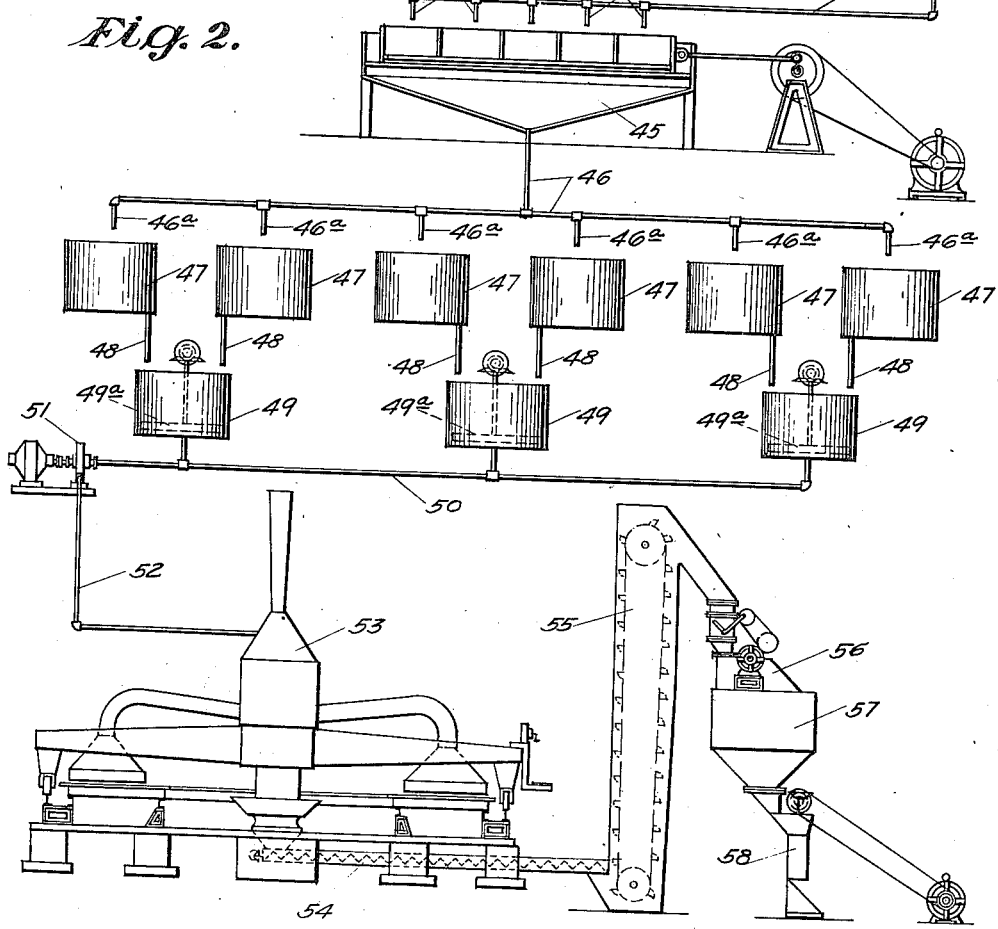
INVENTOR
WM R. MACKLIND.
ATTORNEY Patented Mar. 6, 1923.

1,447,592

UNITED STATES PATENT OFFICE.

WILLIAM R. MACKLIND, OF CHICAGO, ILLINOIS.

APPARATUS AND PROCESS FOR MAKING LITHOPONE.

Application filed August 16, 1919. Serial No. 317,978.

*To all whom it may concern:*

Be it known that I, WILLIAM R. MACKLIND, a citizen of the United States, residing at Chicago, in the county of Cook and State of Illinois, have invented certain new and useful Improvements in Apparatus and Processes for Making Lithopone, of which the following is a specification.

My invention relates to an improved apparatus for and process of making lithopone, and the like, the present embodiment of the invention being particularly designed and adapted for use in the manufacture of a paint pigment known as "lithopone" from the base liquors ordinarily used in such connection, together with improved means of treating the same from precipitation to finished product.

The improved method or process, together with the apparatus for carrying the same into effect is adapted not only to reduce the cost of manufacture, but to generally improve the quality and properties thereof.

As contradistinguished from present processes, the improved process is a continuous one embodying the use of a continuous lithopone sludge drying device and thereby eliminating the use of filter presses now commonly used in the initial stages of lithopone manufacture. By my improved method the drying of the lithopone is effected in a finely divided condition in a continuous muffle, as contradistinguished from the commonly employed intermittently operating muffle; the material is then treated in a continuous quenching device, as contradistinguished from the intermittent quenching device now commonly employed; then follows the use of a wet grinding or texture giving device; then follows the use of a gravity sizing device for grading the lithopone, after which it is subjected to a continuous washing system which entirely eliminates any objectionable elements and cleans and purifies it; the material is then passed through a continuous bolting device for removing any organic matter and for cleansing the same in a wet state; at this point I again eliminate the use of filter presses used in present processes and substitute therefor a continuous drying device or unit which finishes the product ready for grinding and after being here finished through grinding and air floating it is packed.

By the use of my improved process, eliminating the use of filter presses and drying kilns and the use of my improved continuous treatment, as above referred to, a product of exceedingly smooth or silky texture results.

With the above mentioned and other ends in view, the invention consists in the improved method or process, together with the improved apparatus for carrying the same into effect, such apparatus consisting in the novel construction, arrangement and combination of parts, hereinafter described, illustrated in one of its embodiments in the accompanying drawings, and particularly pointed out in the appended claims.

Referring to the drawings, forming a part of this specification, Figure 1, is a side elevation of a portion of a suitable apparatus or system for carrying the improved process into effect, some of the parts being somewhat diagrammatically illustrated and approximately the first half of the system being shown.

Fig. 2, a similar view of the other or remaining portion of the apparatus or system.

Similar numerals of reference designate like parts throughout all the figures of the drawings.

The first or initial portion of the improved apparatus or system comprises the base liquor carrying tanks 1, adapted to carrying the base liquors, such as barium sulphide liquor (BaS) and zinc sulphate ($ZnSO_4$) liquor from which the lithopone is produced thru precipitation. The tanks 1, are provided with discharge pipes 2, leading to the weighing tanks 3, carried by the scales 4. The scales 4, are adapted to weigh the charges of liquors in the tanks 3.

The tanks 3, are provided with discharge pipes 5, leading to the lithopone precipitating tank 6. As the name implies, the precipitating tank 6, is the tank or unit wherein the two base liquors are thrown into contact and under agitation the lithopone is precipitated. This agitation may be accomplished in any suitable manner, as for example through the medium of the agitating elements $6^a$, mounted on the shaft $6^b$, and provided with gearings communicating with any suitable and convenient source of power.

The precipitated lithopone is delivered from the tank 6, through the medium of the discharge pipe 7, communicating with the horizontal pipe $7^a$, having the branch or discharge pipes $7^b$, the latter discharging into the subjacent settling tanks 8. The tanks 8, are adapted to hold in reserve the lithopone as precipitated and at the same time allow the pulp to thicken to the proper consistency to be handled by the continuous drying device. The supernatant water in the tanks 8, may be removed in any suitable and convenient manner, as for example by means of syphons in order that no solid material be lost. The settling tanks 8 are provided with discharge pipes 9, leading to the subjacent mixing tanks 10, the latter being provided with mixer or beater elements 10ª, mounted and driven similarly to the elements 6ª, in the tank 6, said beater elements being adapted to beat the pulp into a smooth creamy substance of the proper consistency for the drying operation which subsequently follows: The mixing tanks 10, are provided with a discharge pipe 11, communicating with a pump 12, the latter discharging the material to the drier 14. The drier 14, is of the continuous type and acts continuously to receive the pulp as delivered through the pipe 13, by the pump 12. The pulp as delivered into the drier 14, is of a consistency varying approximately from 30 to 75% of moisture and the drier 14, continuously evaporates the liquid and delivers the material in a granular or flaky form to the conveyor 15. The conveyor 15, delivers the dry material to the elevator or conveyor 16, the latter delivering the dry pigment into the storage and feeding element or bin 17. The feeding element 17, forms a receptacle to accumulate the dried material and feed the same to the muffler unit, as hereinafter described.

The storage unit 17, is provided with a discharge pipe 18, communicating with an automatic feeding device 19, the latter delivering the dry material continuously and at the proper rate of feed to the muffle furnace 20. The muffle furnace 20, is of the continuously operating rotary drum type and is arranged to keep the dry lithopone out of contact with oxygen while passing through the muffle furnace, the latter delivering the lithopone to the automatic feeder 21, and the feeder 21, delivering the material continuously to the quenching tank 23, and being arranged to trap any oxygen which otherwise might get into the muffle furnace 20.

The feeder 21, communicates with the quenching tank 23, through the discharge pipe 22, and as a means of supplying water to the tank 23, the latter is provided with a water pipe 25, communicating with any suitable source of supply. The quenching tank 23, is provided with a vent pipe 24, adapted to release the vapors accumulating in the tank 23, in the quenching process. The material is discharged from the tank 23, through the medium of the discharge pipe 26, the lithopone being delivered to the storage and mixing tanks 27, and being carried in suspension therein.

The tanks 27, are provided with suitable agitators 27ª, for the purposes of keeping the material in a proper state of consistency preparatory to wet grinding to proper texture in the grinding or attrition mill 29, hereinafter referred to.

The quenched material is delivered to the mill 29, through the medium of the delivery pipe 28, and the mill 29, is adapted to not only smooth and reduce the material to its original or precipitated fineness, but also to polish it. The mill 29, is provided with a discharge pipe 30, delivering the finely divided material to the gravity sizers 31. At this point the lithopone is reduced to proper grade or size and the tailings are delivered through the pipe 32, to the pump 33, the latter acting to take the oversize material or tailings from the gravity separators 31, and deliver the same through the pipe 34, to the mixing tanks 27, and passing and repassing therethrough and through the grinding mill 29, the material is reduced to proper size and consistency.

The sized and finished material passes from the sizers 31, through the discharge pipe 35, into the storage tank 36. The tank 36, holds the lithopone preparatory to being passed into the washer units or tanks and the lithopone is delivered from the tank 36, through the pipe 37, the latter communicating with the first pump 38, and the pump 38, delivering the lithopone in suspension through the discharge pipe 39, to the first unit of the washing system.

The washing system comprises a series of treating or washing units or tanks 41, wherein the lithopone is washed to free the same from any organic or other soluble matter and wherein also it may be subjected to treating or chemical fluids as it passes in suspension through the washing system.

The tanks or units 41, are provided with water through the pipe 40, communicating with a suitable source of supply and provided with discharge pipes 40ª, the latter furnishing the treating tanks 41, with the requisite amount of water.

The lithopone in suspension is carried through the various treating tanks through the pipes 43, communicating with pumps 38, the latter conveying the same through the pipes 39, and the pipes 39, discharging into the tops of the treating tanks 41.

The waste or overflow water after serving its purpose is permitted to pass through branch pipes from the tops of the treating units into the overflow pipe 42. The lithopone from the last washer is delivered by the last pump into a discharge pipe 44, the latter being provided with branch discharge pipes 44ª, discharging into suitable compartments of a bolting mill or unit 45, having silk bolting cloth. In the bolting unit 45, the lithopone is passed continuously through the silk bolting cloth of the bolting mill and the lithopone is thus cleared of any further objectional matter. The material as thus treated passes from the bolting unit through the discharge pipe 46, the latter having branch pipes 46ª, discharging the bolted material to the storage and settling tanks 47. In the tanks 47, the surplus water is syphoned off and the lithopone thus thickened is passed to the drying units hereinafter referred to through the discharge pipes 48. Before, however, being passed to the drier, the material is further mixed and reduced to proper consistency through the medium of the mixing tanks or units 49, the latter being provided with agitators or mixers 49ª, for reducing the pulp to proper consistency after which the pulp is passed through the pipe 50, through the suction of the pump 51, and through the discharge pipe 52, to the drying unit 53.

The pulp is delivered continuously to the drier 53, through the discharge pipe 52, and after being dried is delivered from the latter through the medium of the conveyor 54, to the elevator 55. The elevator 55, delivers the dried material to the grinding and air floating unit 56, and from the latter is delivered in proper commercial or finally treated state into the storage bin or unit 57, the latter being provided with means for delivering it to a packing unit 58.

From the foregoing description, taken in connection with the accompanying drawings, the operation and advantages of my invention will be readily understood.

Having thus described my improved process, together with a suitable means or apparatus for carrying the same into effect, what I claim and desire to secure by Letters Patent, is,—

1. In the process of making lithopone, continuously operating, muffling, quenching, sizing and washing in a constantly moving stream from precipitation to finished product.

2. The process of making lithopone in which the latter is reduced to and moved in a continuously moving stream in a finely divided condition from precipitation to packing.

3. In the art of making lithopone, a continuous system in which a constantly traveling stream of material is passed thru suitable treating units from precipitation to finished product.

4. The process of making lithopone, comprising continuous precipitating, mixing and settling in a constantly moving stream in a finely divided condition from precipitation to packing.

5. A continuous process of making lithopone in which the latter is moved in a constantly traveling stream of material from precipitation to packing and is subjected to continuous washing and settling treatments as intermediate steps.

6. A continuous process of making lithopone in which the latter is caused to pass in a constantly moving stream and is subjected to continuous treatment from precipitation to final packing.

7. The process of making lithopone in which the latter is reduced to a finely divided condition and moved in a continuously traveling stream from precipitation to final packing, including continuously operated drying and oxygen free muffle furnace treatment.

8. The process of making lithopone, comprising continuous precipitation, mixing, grinding, washing and settling, the lithopone being continuously handled and maintained in a constantly moving finely divided condition from precipitation to packing.

9. In the art of making lithopone in a constantly traveling stream, a series of successively arranged treating units including muffling, quenching and washing units, and means for continuously passing such stream of material to and thru said units.

10. The process of treating lithopone, consisting in (1) precipitating from the base liquors and settling and mixing, (2) then passing in a constantly traveling stream thru drying, muffling, quenching and mixing means, (3) grinding, sizing, washing, bolting, settling and mixing in a constantly moving stream, and (4) thereafter passing in such constantly traveling stream thru continuous operating dryer, grinding and air-floating means to the point of final packing.

11. In an apparatus for making lithopone, base liquor carrying tanks and precipitating tanks in communication, settling tanks and means for transferring material from the precipitating tanks thereto, mixing tanks adapted to receive material from said settling tanks, successive drying, muffling, quenching and settling units, and means for continuously passing material from said mixing tanks to and thru said units.

12. In an apparatus for making lithopone, base liquor carrying tanks and precipitating tanks in communication, settling units communicating with said precipitating units, mixing units receiving the material from said settling units, and drying, muffling and quenching units, said drying units having forced communication with said mixing units whereby a continuous stream of material is passed therebetween, and means for passing such stream of material continuously between said drying, muffling and quenching units.

13. In an apparatus for making lithopone, the combination with precipitating, settling and mixing units, and means for passing a continuous stream of material thru and between said units; of drying, muffling, quenching and mixing units, means for passing a continuous stream of material between said first mentioned mixing unit and said drying unit and between the latter and said muffling, quenching and mixing units; grinding, sizing, washing, bolting and settling units, and means for passing a continuous stream of material between said last mentioned group of units.

14. In an apparatus for making lithopone, the combination with base liquor and precipitating tanks, and settling tanks and means for transferring material from the precipitating tanks, mixing tanks adapted to receive material from said settling tanks, and mixing and continuously operating drying, muffling, quenching and mixing units; of means for forcing a continuous stream of material through and between all of said units, successive attrition, sizing, washing, bolting, settling and mixing units, means for passing a continuous stream of material thru and between said units, and means for continuously drying and packing said material including air-floating and packer units.

15. An apparatus for making lithopone, comprising base liquor carrying units and precipitating units in communication, settling and mixing units communicating with each other, said mixing units being provided with pump mechanism communicating with drying units; muffling, quenching and mixing units, means for carrying the material in a continuous stream between and thru said last mentioned units; grinding, sizing, washing, bolting, settling and mixing units, means for causing a continuous stream of material to pass thru said units; dryer, grinding, air-floating and packer units; and pump and conveyor mechanism between said mixing and dryer units and between the latter and said grinding units and air-floating units respectively, whereby a continuous stream of constantly moving material is passed from one unit to the other from initial precipitation to final packing.

In testimony whereof I have affixed my signature.

WILLIAM R. MACKLIND.